July 28, 1931. H. A. BRASSERT ET AL 1,815,898
APPARATUS FOR CLEANING GASES
Filed Jan. 27, 1928
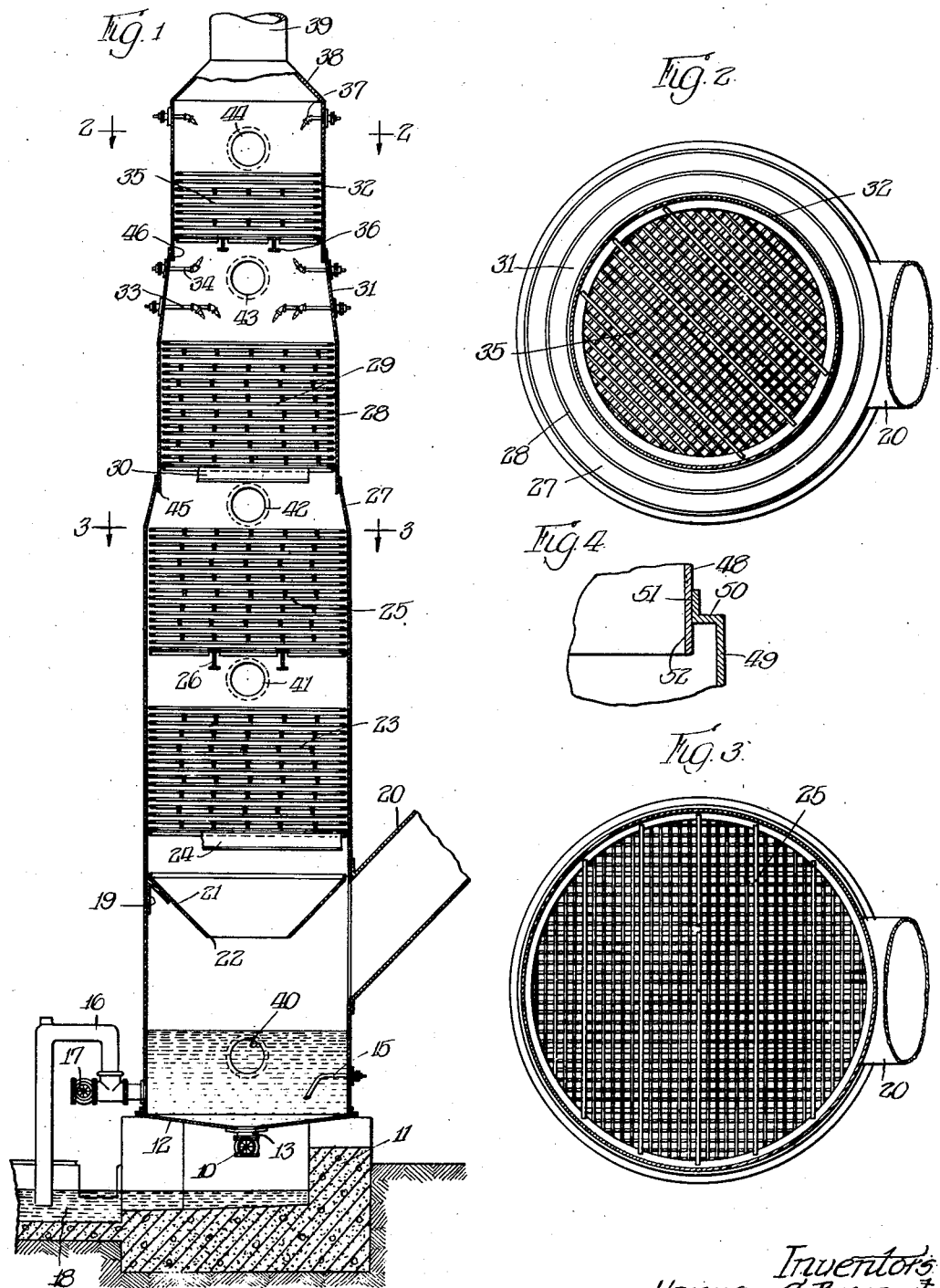
Inventors
Herman A. Brassert,
Frederick W. Barrett, Patented July 28, 1931

1,815,898

UNITED STATES PATENT OFFICE

HERMAN A. BRASSERT AND FREDERICK W. BARRETT, OF CHICAGO, ILLINOIS, ASSIGNORS TO H. A. BRASSERT & COMPANY, OF CHICAGO, ILLINOIS, A CORPORATION OF ILLINOIS

APPARATUS FOR CLEANING GASES

Application filed January 27, 1928. Serial No. 249,874.

This invention relates to a new and improved apparatus for cleaning gases in stationary water sprayed towers and more particularly to a method and apparatus of the kind which are used for cleaning blast furnace gas.

In such gas cleaning towers, as originally designed, the gas was subjected to the simple washing effect of a heavy rain caused by the introduction of sprays at the top of the tower. Subsequent methods combined this washing effect with that of scrubbing, which was obtained by placing wooden hurdles in the washer, which offered more or less of a scrubbing surface to the ascending gases and through friction between the wood and the gases resulted in better cleaning.

Various refinements in the design of such scrubbing towers were developed; for instance, the tower most commonly used in the United States uses the common Zschocke hurdles, consisting of rows of vertical wooden slats, in the lower portion of the tower for the rough cleaning of the gas, the slats having sufficient spacing so as to prevent clogging by the dirty gases. For the finer cleaning in the upper part of this tower, inclined slats or baffles are used, against which sprays were directed, and by which, in passing through, the gases were deflected approximately 45° out of their vertical direction. The combined area of the passages between these inclined slats was considerably less than that through the bottom hurdles, the purpose being to increase both the scrubbing surface and the velocity of the gases. While the embodiment of these inclined elements in the washer resulted in a cleaner gas with a given amount of water, yet it has been found that there is still sufficient dust left in the gas after passing through these towers to prevent its use for many purposes, such as the heating of coke ovens, rolling mills, heating and annealing furnaces, gas engines, and other uses requiring an almost perfectly clean gas. Such a degree of cleanliness can in most cases only be obtained by mechanical washers, the bag filter process, or by the electric precipitation method. It is very desirable that the cleaning should be carried to as fine a degree as possible in the stationary washer, which, for economical reasons, chiefly that of saving power, should precede any mechanical washer.

All towers designed for the washing of blast furnace gas or other metallurgical gases have heretofore been of cylindrical shape. This has resulted in a much higher velocity of the gases for the lower sections than that prevailing in the upper sections of the tower. Inasmuch as it requires a certain velocity to produce effective scrubbing as between the gases and hurdles, past designs, such as those of Herman A. Brassert, employed a closer spacing of the hurdles in the upper sections of the tower. Also a different type of hurdles was employed, namely, inclined baffles closely spaced and inclined at an angle in order to increase the scrubbing effect. All of these designs have the disadvantage of clogging up too readily when there is an excess of dust in the gas or when there is a temporary diminution of the water supply.

Another disadvantage of the present towers is that the entire area corresponding to that required in the lower section is employed in the upper section of the tower and has to be completely covered by sprays, otherwise the final stage of cleaning, which is the most important, is not properly performed. This generally involves using more water than should be required. It also necessitates applying the sprays close enough to the walls of the tower so as to safely cover the hurdles near the periphery. A considerable portion of this water is wasted as far as effective cleaning is concerned because it runs down the shell.

We have overcome these difficulties in our present invention by constructing a tower of varying diameters, the largest diameter being at the bottom and the smallest at the top. In this way we keep the velocity of the gas more nearly alike at the bottom and the top and we are not compelled to employ too close a spacing of the hurdles in order to obtain effective scrubbing. This design results in a much smaller area of hurdles having to be covered by the top sprays so that less sprays are required. The conical section below the top hurdles and the hurdles underneath will tend to allow excess water collected on the shell to drop away from the shell and become an effective cleaning agent in the hurdles below. This action can be increased by extending the cylindrical sections downwardly so as to overlap the conical sections. In this way the water can be kept away from the shell as much as desired. We preferably use three or four cylindrical sections of the tower each filled with hurdles and conical sections without hurdles between each two cylindrical sections. However, the tower could also be constructed with more or less sections and it could be entirely filled with hurdles with all the sprays applied at the top. Another way to construct the tower is by using cylindrical sections throughout of diminishing diameters with horizontal offsets between. We preferably use wooden hurdles but sheet metal hurdles or wire screens may also be used.

This new design has the advantage of a cheaper construction in that considerable weight of metal is saved in the shell as well as in the platforms, also a smaller amount of woodwork and fewer sprays are required. The bottom of the tower instead of being steeply conical as in the usual type is preferably built with only a slight depression, the water collecting in the bottom being kept in continuous or intermittent motion by a nozzle. This construction saves considerable height and therefore decreases the head to which the water has to be pumped and therefore will result in a saving of power, notwithstanding the small amount of water used for agitating the bottom.

It is an object of the present invention to provide a new and improved and more efficient method and apparatus for cleaning gas by the stationary washer method.

It is a further object to provide a new and improved gas washing apparatus adapted to maintain an approximately uniform velocity of gas throughout the apparatus.

It is an additional object to provide an apparatus of this character in which the successive sections are reduced in cross sectional area in approximate conformity with the reduction in volume of the cleaned and cooled gases.

It is also an object to provide a construction in which baffles and hurdles of substantially uniform spacing may be used efficiently throughout the apparatus.

It is also an object to provide a construction in which the flow of water down the walls is broken and the water returned to the central area of the apparatus.

It is an additional object to provide a construction which requires less material than usual forms and which is of strong and comparatively simple design and cheaper in construction.

Other and further objects will appear as the description proceeds.

We have illustrated a preferred embodiment of our invention in the accompanying drawings, in which Figure 1 is a vertical section through the apparatus;

Figure 2 is a horizontal section taken on line 2—2 of Figure 1;

Figure 3 is a horizontal section taken on line 3—3 of Figure 1; and

Figure 4 is a fragmentary section illustrating a modified form of construction.

In the drawings the tower is shown as supported upon a concrete foundation 11 upon which rests the bottom 12. This bottom is sloped toward the center from which leads the drain connection 13, controlled by valve 10. The nozzle 15 is extended in from the side adjacent the bottom for the introduction of fluid under pressure to cause a swirling motion in the bottom for the efficient removal of the accumulated solid matter, as desired. The overflow pipe 16 is also connected to the side adjacent the bottom. This pipe is connected to valve 17 and is also connected to drain 18 which forms a water seal.

The lower cylindrical section 19 of the tower is provided with the intake passage 20 through which the gases to be cleaned enter. The conical member 21, which may be perforated and which has the central opening 22, is located adjacent the point of entrance of the passage 20. This member is spaced from the walls of the section 19. The series of baffles 23 are supported by cross beams 24 and a second series of baffles 25 are supported by cross beams 26. The top of the lower cylindrical section 19 is connected by the frusto-conical section 27 to the second cylindrical section 28. The cylindrical section 28 contains the baffles or hurdles 29 supported on cross beams 30. The top of the cylindrical section 28 is joined by the frusto-conical section 31 to the upper cylindrical section 32. Into the section 31 are directed a plurality of spray nozzles 33 which direct a spray downwardly upon an angle and the upwardly directed nozzles 34 throw a spray upwardly upon an angle. In the cylindrical section 32 are located the series of baffles 35 supported upon the cross beams 36. Above the hurdles 35 is located another series of nozzles 37. The upper portion of the tower 38 is conical in form and joins the offtake passage 39 for the cleaned gases. A plurality of man holes 40, 41, 42, 43 and 44 are shown as provided at spaced points for the insertion, removal or cleaning of the hurdles as desired.

It will be noted that the lower edge 45 of the cylindrical portion 28 extends down into the frusto-conical portion 27, and that similarly, the lower edge of the cylindrical portion 32 extends downwardly into the top of the frusto-conical portion 31. A considerable quantity of the water passing through the tower tends to run out of the inside surfaces of the tower and these edges 45 and 46 serves as points from which the water flowing down the respective cylindrical sections is dropped on to the hurdles in the next lower section. The flow of water down the walls is thus interrupted and the water periodically returned to the hurdles where its washing action is much more effective than upon the walls.

A modified form of construction is indicated in Figure 3 where the tower may be made up of a plurality of cylindrical sections 48 and 49. These sections are directly connected without the use of frusto-conical sections. The upper edge of the lower cylindrical section 49 is turned inwardly at 50 and riveted or otherwise secured at 51 to the outer face of the upper section 48. The lower edge of the section 48 extends at 52 down into the section 49 to assist in returning the water from the side walls to the hurdles of the lower section, as has been described in connection with the other form of construction.

While we have shown certain preferred forms of construction, our invention is capable of further changes and modifications and we contemplate such variations as come within the spirit and scope of the appended claims.

We claim:

1. Apparatus for cleaning and cooling gases comprising a unitary vertical structure having alternate cylindrical and frusto-conical superposed contact sections, each of the upper cylindrical sections being of less diameter than the next lower cylindrical section, means for introducing cleaning and cooling water into the upper portion of the structure, means for bringing the water in contact with the gases, and means for removing the water and accumulated solid matter from the bottom of the structure.

2. Apparatus for cleaning and cooling gases comprising a tower having a plurality of superposed contact sections of progressively reduced cross sectional area in the direction of gas flow, means for introducing water into the upper portion of the tower and against the tower walls, and means for returning water from the tower walls to the area within the tower.

3. Apparatus for cleaning and cooling gases comprising a tower having a plurality of superposed sections, the lower edges of certain of the sections extending into the next lower sections and spaced from the walls of said lower sections.

4. Apparatus for cleaning and cooling gases comprising a tower comprising a plurality of alternating cylindrical and frusto-conical sections, the lower edges of certain of the cylindrical sections extending down into the adjacent frusto-conical sections and spaced from the walls thereof.

Signed at Chicago, Illinois, this 24th day of January, 1928.

HERMAN A. BRASSERT.
FREDERICK W. BARRETT.